United States Patent
Shendge et al.

(10) Patent No.: US 9,941,626 B2
(45) Date of Patent: Apr. 10, 2018

(54) UNIVERSAL TOP AND BOTTOM CABLE ENTRY ELECTRICAL RECEPTACLE ASSEMBLY

(71) Applicant: APPLETON GRP LLC, Rosemont, IL (US)

(72) Inventors: Vilas Subhash Shendge, Maharashtra (IN); Shivlingayya Vishwanath Swami, Maharashtra (IN)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 15/522,707

(22) PCT Filed: Jul. 22, 2015

(86) PCT No.: PCT/IB2015/055550
§ 371 (c)(1),
(2) Date: Apr. 27, 2017

(87) PCT Pub. No.: WO2017/013470
PCT Pub. Date: Jan. 26, 2017

(65) Prior Publication Data
US 2017/0331221 A1  Nov. 16, 2017

(51) Int. Cl.
*H01R 13/58* (2006.01)
*H01R 13/625* (2006.01)
(Continued)

(52) U.S. Cl.
CPC .............. *H01R 13/58* (2013.01); *H01R 4/02* (2013.01); *H01R 13/625* (2013.01); *G05G 1/00* (2013.01)

(58) Field of Classification Search
CPC .................................................... H01R 13/58
(Continued)

(56) References Cited

U.S. PATENT DOCUMENTS 3,697,714 A * 10/1972 Gryctoko .................. H01H 3/08
200/293
4,553,000 A * 11/1985 Appleton ............. H01R 13/629
200/50.29
(Continued)

FOREIGN PATENT DOCUMENTS

CN            103515765 A      1/2014

OTHER PUBLICATIONS

PCT International Search Report and Written Opinion, PCT International Application No. PCT/IB2015/055550, dated Feb. 9, 2016, 7 pages.

*Primary Examiner* — Tulsidas C Patel
*Assistant Examiner* — Peter G Leigh
(74) *Attorney, Agent, or Firm* — McDonnell Boehnen Hulbert & Berghoff LLP

(57) ABSTRACT

The present disclosure discloses an electrical receptacle assembly. The electrical receptacle assembly comprises a housing with a first compartment and a second compartment with at least one third opening for receiving power supply cables. The first compartment has a second opening for receiving a switch knob, defined with central axis. A base of the second compartment fitted with a switch assembly in the housing. The switch assembly defines a spindle which is required to align axially with the central axis of the slot of the switch knob. A first and a second switch assembly mounting locations on the base mounts the switch assembly. The first mounting location is used when the power supply cables are positioned to enter the receptacle from operatively below the receptacle and the second mounting location is used when the power supply cables are positioned to enter the receptacle from operatively above the receptacle.

8 Claims, 8 Drawing Sheets

(51) Int. Cl.
*H01R 4/02* (2006.01)
*G05G 1/00* (2006.01)

(58) Field of Classification Search
USPC .......... 439/460, 333; 200/293, 50.31, 50.08, 200/50.29, 50.3, 50.28, 336
See application file for complete search history.

(56) References Cited

U.S. PATENT DOCUMENTS

| | | | | |
|---|---|---|---|---|
| 5,298,701 A | * | 3/1994 | Sandor | H01R 13/707 200/50.31 |
| 5,680,926 A | * | 10/1997 | Sandor | H01R 13/625 200/50.11 |
| 5,741,149 A | * | 4/1998 | Anthony | H01R 13/707 439/314 |
| 6,183,309 B1 | | 2/2001 | Chiang | |
| 6,255,607 B1 | * | 7/2001 | Miller | H01R 13/707 200/50.29 |
| 6,302,743 B1 | | 10/2001 | Chiu et al. | |
| 6,410,868 B1 | * | 6/2002 | Berlemont | H01R 13/707 200/50.28 |
| 6,956,176 B2 | * | 10/2005 | Castaldo | H01R 13/701 200/50.28 |
| 7,119,292 B2 | * | 10/2006 | Castaldo | H01R 13/701 200/50.28 |
| 7,507,919 B2 | * | 3/2009 | Sugahara | H01H 25/06 200/6 A |
| 2003/0134543 A1 | | 7/2003 | McCoy et al. | |

\* cited by examiner

UNIVERSAL TOP AND BOTTOM CABLE ENTRY ELECTRICAL RECEPTACLE ASSEMBLY

CROSS REFERENCE TO RELATED APPLICATIONS

The present application is a national stage entry of PCT/IB2015/055550, filed Jul. 22, 2015, which is incorporated herein by reference for all purposes.

FIELD

The present disclosure relates to an electro-mechanical device. More specifically, the present disclosure relates to an electrical receptacle assembly.

Definitions of Terms Used in the Specification

The expression 'universal position' used hereinafter in this specification refers to a straight position or an upside-down position, relative to the straight position.

The definition is in addition to those expressed in the art.

BACKGROUND

In hazardous locations, such as NEC Class I, Division 2, IEC Zone I areas, a receptacle (also known as socket) and an electrical plug is required to supply electric power to portable or fixed equipment and/or a machine such as electric motors, compressors, pumps, welding equipment, relay stations. The receptacle holds a switch and the electrical plug enables actuation of the switch to be in the ON position and the OFF position.

Conventionally, the receptacle is installed on a structure and pre-existing electrical cables are introduced in the receptacle through a pre-existing hole provided in the housing of the receptacle. Depending upon the location of the pre-existing electrical cables with respect to the installation position of the receptacle, the pre-existing cables need to be introduced either from the operative top wall or the operative bottom wall of the housing. Hence, in case where the receptacle is placed at the operative bottom with respect to the location of the pre-existing electrical cables, a hole needs to be provided on the operative top wall of the housing for the top entry of the electrical cables and in case where the receptacle is placed at the operative top with respect to the location of the pre-existing electrical cables, a hole needs to be provided on the operative bottom wall of the housing for the bottom entry of the electrical cables.

Hence, while placing an order to manufacture receptacles, it is mandatory to specify whether the hole needs to be provided on the operative top wall or the operative bottom wall of the housing depending upon the location of the pre-existing cables with respect to the receptacles.

In a situation where it was planned that the pre-existing cables will be below the installation position of the receptacle, the receptacle is manufactured with the hole at the bottom wall of the housing. But during installation, either the planned position of the pre-existing cables may be required to be changed and needs to be positioned above the installation position of the receptacle or the planned position of the pre-existing cables was wrongly planned to be below the installation position of the receptacle.

In such case, the manufactured receptacle with the hole at the bottom wall of the housing is required to be closed with an end plug and a new hole is required to be drilled in the operative top wall of the housing. Hence, additional machining is required at the top wall of the housing and additional material is required to cover the hole at the bottom wall of the housing. The requirement of the additional machining and additional material comparatively increases the installation time and the overall cost of the receptacle.

Also, in case if inventory of receptacles is required to be maintained, comparatively more inventory is required for each type of receptacle and inventory management becomes cumbersome.

Hence, there is a need of an electrical receptacle that alleviates the above mentioned problems.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide an electrical receptacle that can be universally installed on a structure based on the positioning of electrical cables.

Another object of the present disclosure is to provide an electrical receptacle that requires comparatively less installation time and less overall cost when the position of the electrical cables is changed.

Still another object of the present disclosure is to provide an electrical receptacle that requires comparatively less inventory management.

Other objects and advantages of the present disclosure will be more apparent from the following description, which is not intended to limit the scope of the present disclosure.

SUMMARY

The present disclosure discloses an electrical receptacle assembly. The electrical receptacle assembly comprises a housing. The housing has a first compartment and a second compartment. The first compartment is defined with a first opening for a female connector to be connected to a male connector of an input power supply and a second opening for receiving a switch knob. The switch knob is defined by a slot along a central axis for receiving a spindle of the switch assembly. The second compartment is defined with at least one third opening for receiving power supply cables. A base of the second compartment is provided for fitting a switch assembly in the housing. The switch assembly defines a spindle which is required to align axially with the slot along the central axis of the switch knob. A first and a second switch assembly mounting locations on the base are provided for mounting the switch assembly thereon such that the spindle is always aligned with the central axis of the switch knob. The first mounting location is configured for use when the power supply cables are positioned to enter the receptacle from operatively below the receptacle and the second mounting location is configured for use when the power supply cables are positioned to enter the receptacle from operatively above the receptacle. Fastners are provided for removably fitting a first compartment with the second compartment with the spindle of the switch assembly aligned and fitted into the slot of the switch knob.

Also is disclosed herein a method of connecting power supply cables to an electrical receptacle in either of two positions, in a first position when the power supply cables are positioned to enter the receptacle from operatively below the receptacle and a second position when the power output the power supply cables are positioned to enter the receptacle from operatively above the receptacle comprising the steps of fitting a switch assembly defining a spindle on one of two sets of mounting locations on a base of one of the compartments of the electrical receptacle, one set configured to accept the switch assembly for the first position and the second set configured to accept the switch assembly for the second position between the receptacle and the power supply cables, selecting one of two openings for mounting a cable gland on the top or the bottom wall of the electrical receptacle for leading the power supply cables into the receptacle, threading the power supply cables through the cable gland and fitting the other compartment of the electrical receptacle bearing a switch knob defining a slot along a central axis in an aligned configuration with the spindle of the switch assembly.

BRIEF DESCRIPTION OF ACCOMPANYING DRAWINGS

FIG. 1 illustrates an exploded perspective view of a receptacle wherein a switch assembly is mounted on a first switch assembly mounting location such that the axis of the spindle of the switch assembly is axially aligned to a slot along a central axis of a switch knob mounted on a first compartment of the electrical receptacle assembly and the power supply cables are disposed from operative bottom of the receptacle, in accordance with one embodiment of the present disclosure;

FIG. 2 illustrates a front view of the receptacle of FIG. 1;

FIG. 3 illustrates an exploded perspective view of a receptacle wherein a switch assembly is mounted on a second switch assembly mounting location such that the axis of the spindle of the switch assembly is axially aligned to a slot along a central axis of a switch knob mounted on a first compartment of the electrical receptacle assembly and the power supply cables are disposed from operative top of the receptacle, in accordance with another embodiment of the present disclosure;

DETAILED DESCRIPTION

Figure 1:
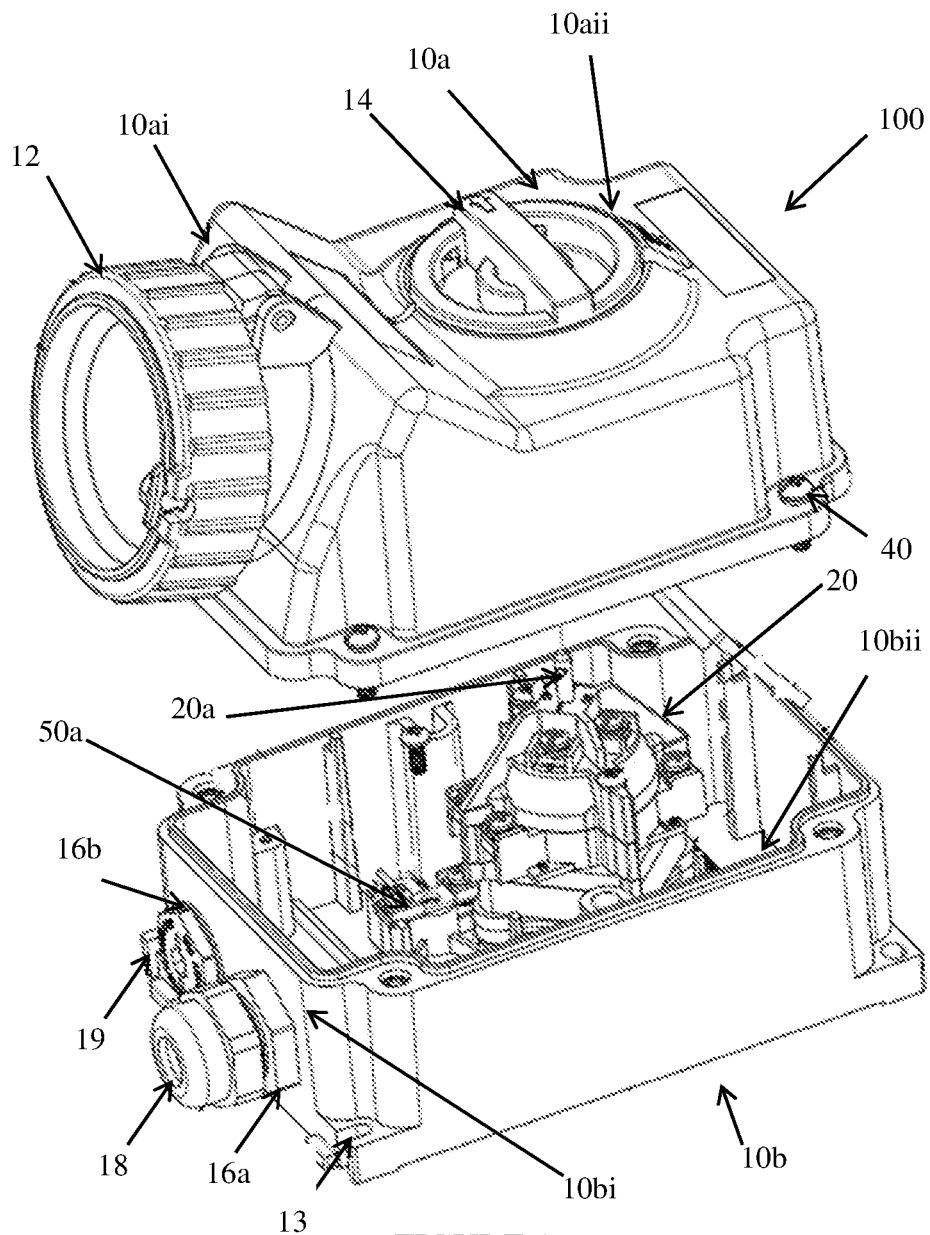
Figure 2:
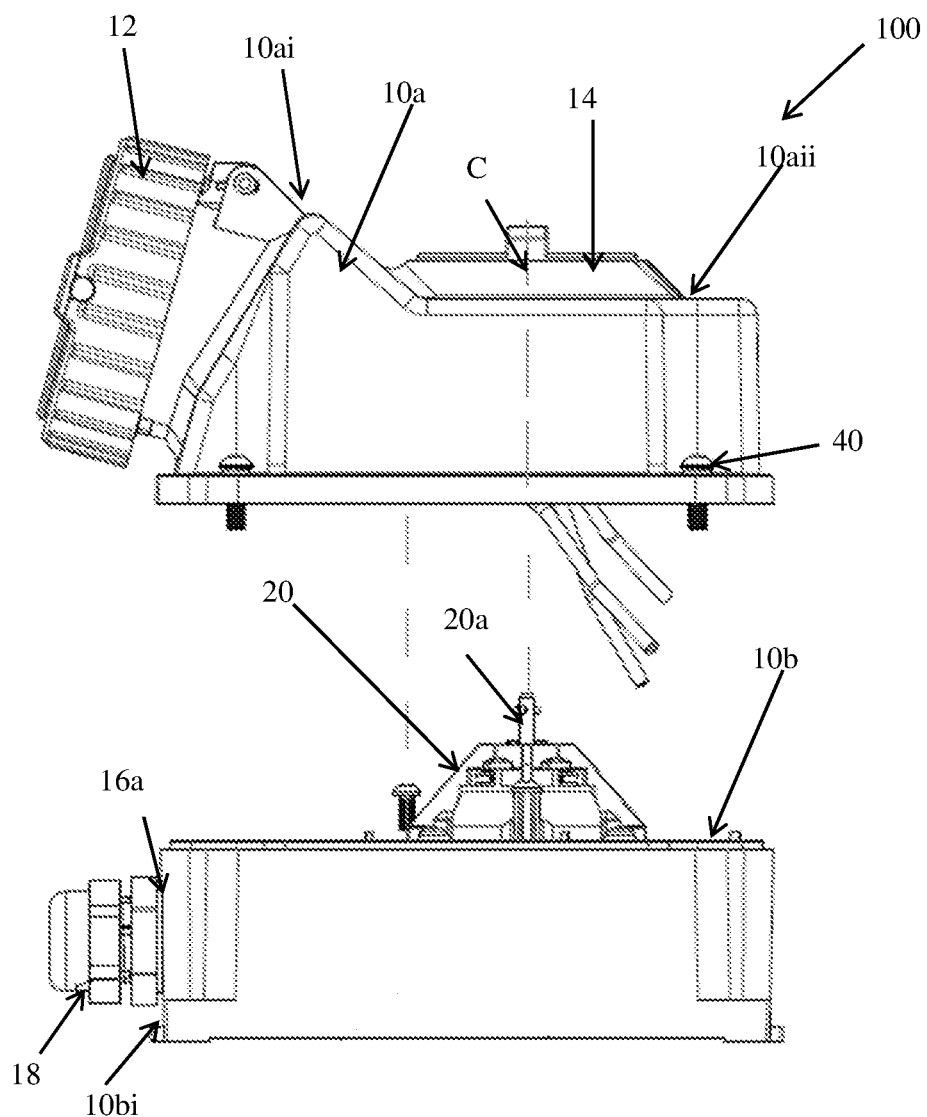
Figure 3:
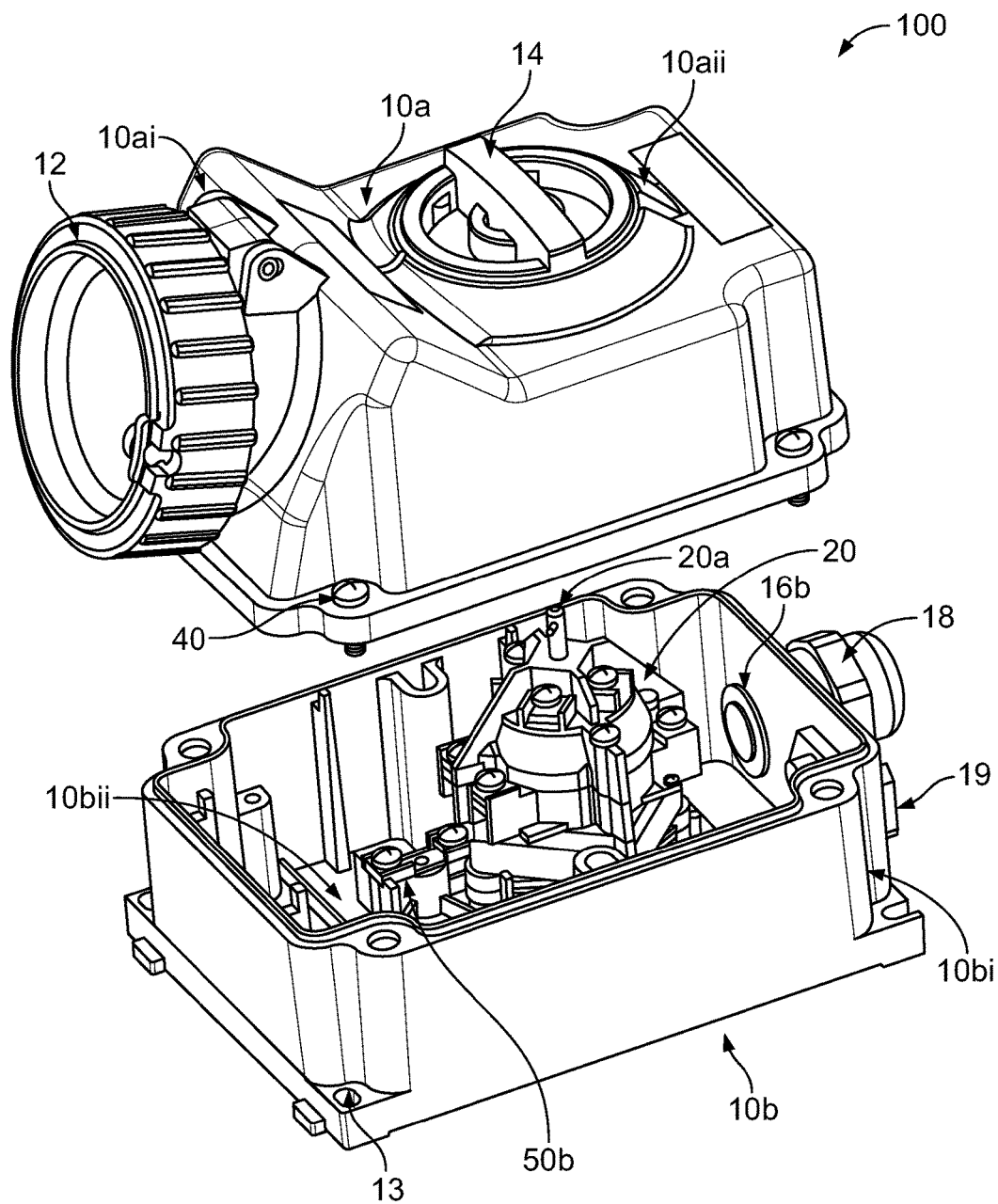
Figure 4:
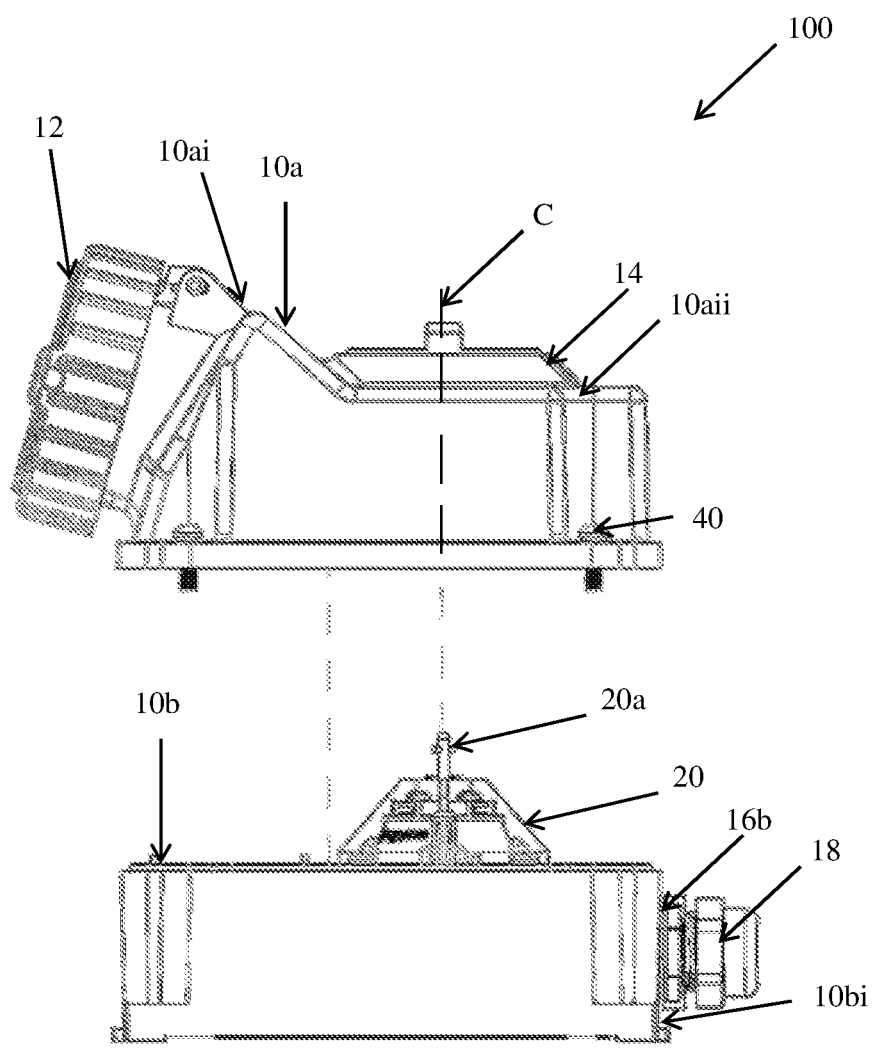
FIG. 4 illustrates a front view of the receptacle of FIG. 3.

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

An electrical receptacle of the present disclosure can be universally installed on a structure based on the positioning of electrical cables. The electrical receptacle requires comparatively less installation time and less overall cost when the position of the electrical cables is changed. The electrical receptacle of the present disclosure requires comparatively less inventory management.

FIG. 1 to FIG. 4 illustrates the electrical receptacle assembly 100. The electrical receptacle assembly 100 comprises a housing. The housing comprises a first compartment 10a and a second compartment 10b. The first compartment 10a is defined by a first opening 10ai for a female connector (not illustrated in Figures) which is housed in a sleeve (not illustrated in Figures) and covered by a cover 12. The female connector can be connected to a male connector (not illustrated in Figures) of an input power supply to equipment and/or a machine such as electric motors, compressors, pumps, welding equipment, relay stations. The first compartment 10a further has a second opening 10aii which receives a switch knob 14. The switch knob 14 defines a slot (not illustrated in Figures) along a central axis 'C'. The second compartment 10b includes mounting holes 13 for mounting the electrical receptacle assembly 100 to a structure (not illustrated in Figures) such as a wall or a pole or a cabinet and the like.

The second compartment 10b is defined with at least one third opening 16a for receiving power supply cables (not illustrated in Figures). In one embodiment, at least one third opening 16a is configured to receive a cable gland 18 through which the power supply cables are led into the electrical receptacle assembly 100. In one embodiment, two third openings 16a and 16b are provided on the operative bottom wall 10bi of the second compartment 10b for fixing the cable gland 18 in the two operative positions of the power supply cables with respect to the electrical receptacle assembly 100 in either of the two third openings 16a and 16b, the un-operative third opening 16b being sealed with a plug 19. Typically, the third opening 16a is configured to receive power supply cables along an orthogonal operative vertical axis. In another embodiment, two third openings may be provided on the operative top walls of the electrical receptacle assembly 100.

Further, the second compartment 10b has a base 10bii for fitting a switch assembly 20 in the housing. The switch assembly 20 is defined by a spindle 20a which is required to align axially with the slot along the central axis 'C' of the switch knob 14.

A first switch assembly mounting location 30a and a second switch assembly mounting location 30b is provided on the base 10bii for mounting the switch assembly 20 thereon such that the spindle 20a is always aligned with the central axis 'C' of the switch knob 14. The first switch assembly mounting location 30a is configured for use when the power supply cables are positioned to enter the electrical receptacle assembly 100 from operatively below the electrical receptacle assembly 100 and the second mounting location 30b is configured for use when the power supply cables are positioned to enter the electrical receptacle assembly 100 from operatively above the electrical receptacle assembly 100. In one embodiment, the first switch assembly mounting location 30a and the second switch assembly mounting location 30b are formed on the base 10bii in form of a hexagon, the first switch assembly mounting location 30a and the second switch assembly mounting location 30b are defined at the vertices of the hexagon.

Further, fasteners 40 are provided for removably fitting a first compartment 10a with the second compartment 10b with the spindle 20a of the switch assembly 20 aligned and fitted into the slot defined along the central axis 'C' of the switch knob 14. In one embodiment, the fasteners are bolts.

In accordance with one embodiment, the base 10bii includes locations 50a and 50b for fitting an earthing cable within the electrical receptacle assembly 100 in the two positions of the receptacle assembly 100.

Figure 5A:
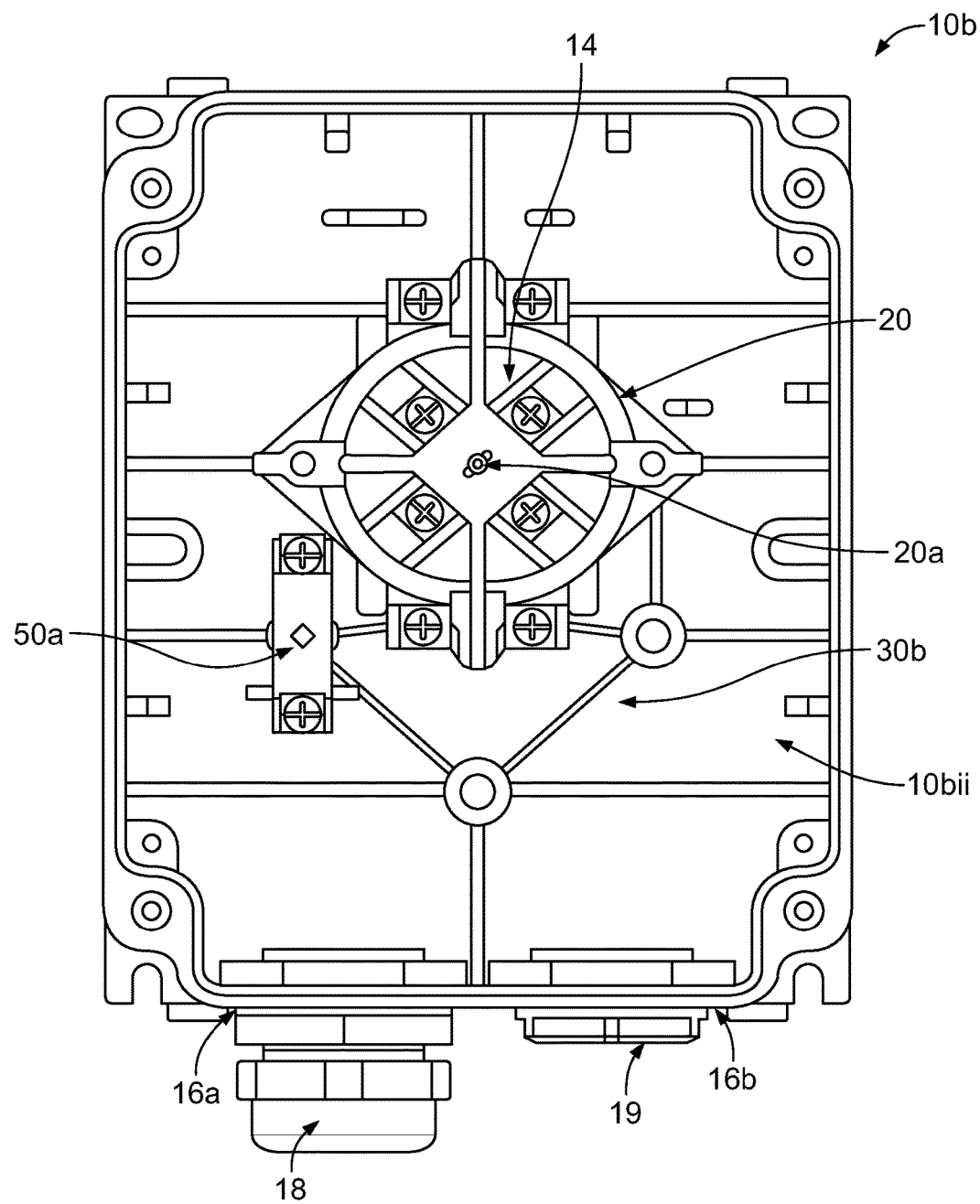
FIG. 5a illustrates a top view of a second compartment of a housing of the receptacle of FIG. 1, wherein the switch assembly is mounted on the first switch assembly mounting location.
Figure 5B:
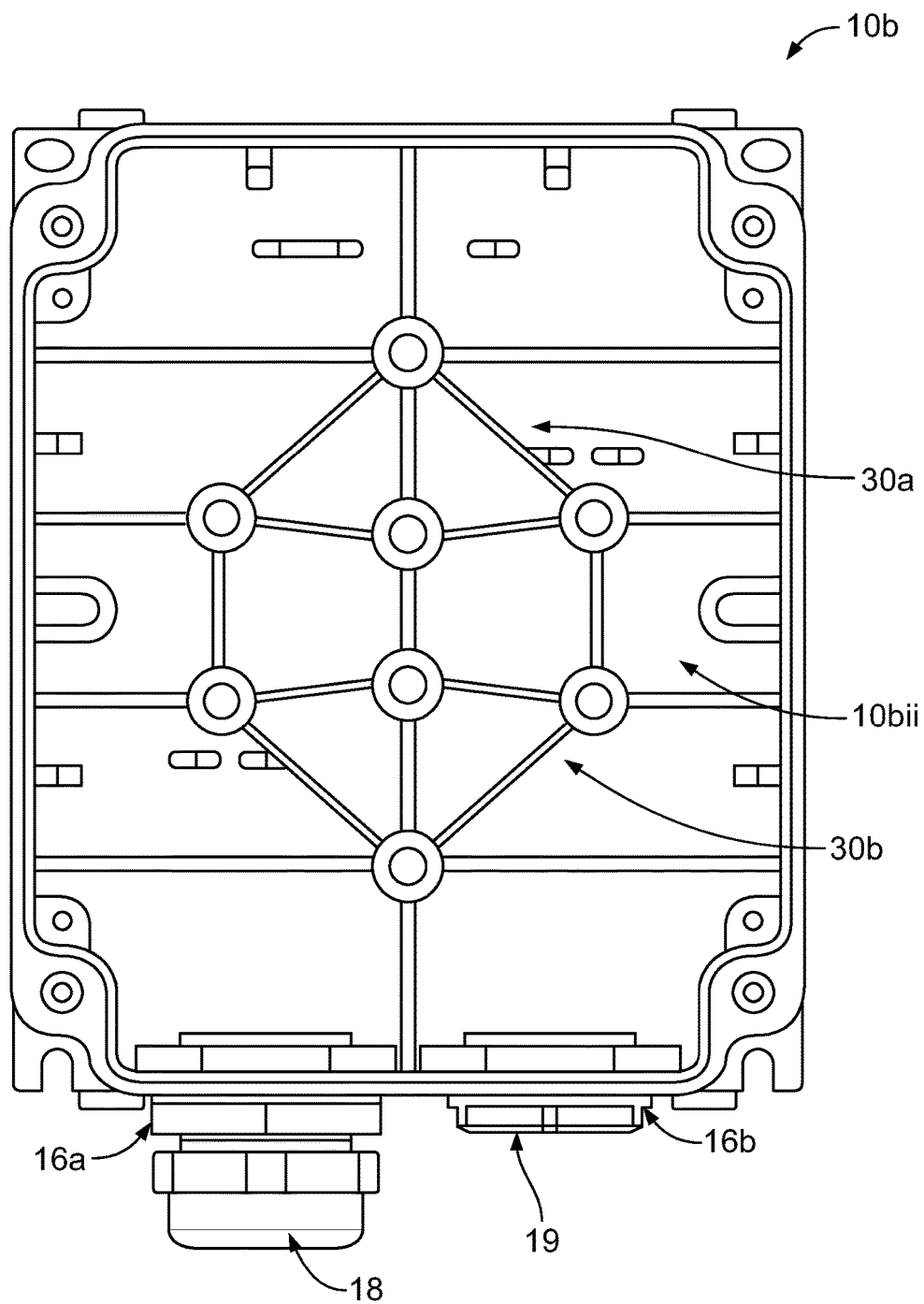
FIG. 5b illustrates a top view of the second compartment of FIG. 5a without the switch assembly.

In accordance with another aspect of the disclosure, there is provided a method of connecting power supply cables to the electrical receptacle assembly 100 in a first position when the power supply cables are positioned to enter the electrical receptacle assembly 100 from operative below of the electrical receptacle assembly 100 is disclosed. Initially, the switch assembly 20 which is defined by the spindle 20a is mounted on the second switch assembly mounting location 30b (which is a second position) provided on the base 10bii of the second compartment 10b of the electrical receptacle assembly 100 is positioned to the first switch assembly mounting location 30a as illustrated in FIG. 5a and FIG. 5b. There-after, the cable gland 18 is removed from the third opening 16b and positioned on the third opening 16a for leading the power supply cables into the electrical receptacle assembly 100. The power supply cables are then threaded through the cable gland 18 positioned at the third opening 16a. There-after, the first compartment 10a is fitting to the second compartment 10b such that the central axis 'C' of the slot is aligned with the axis of the spindle 20a of the switch assembly 20.

Figure 6A:
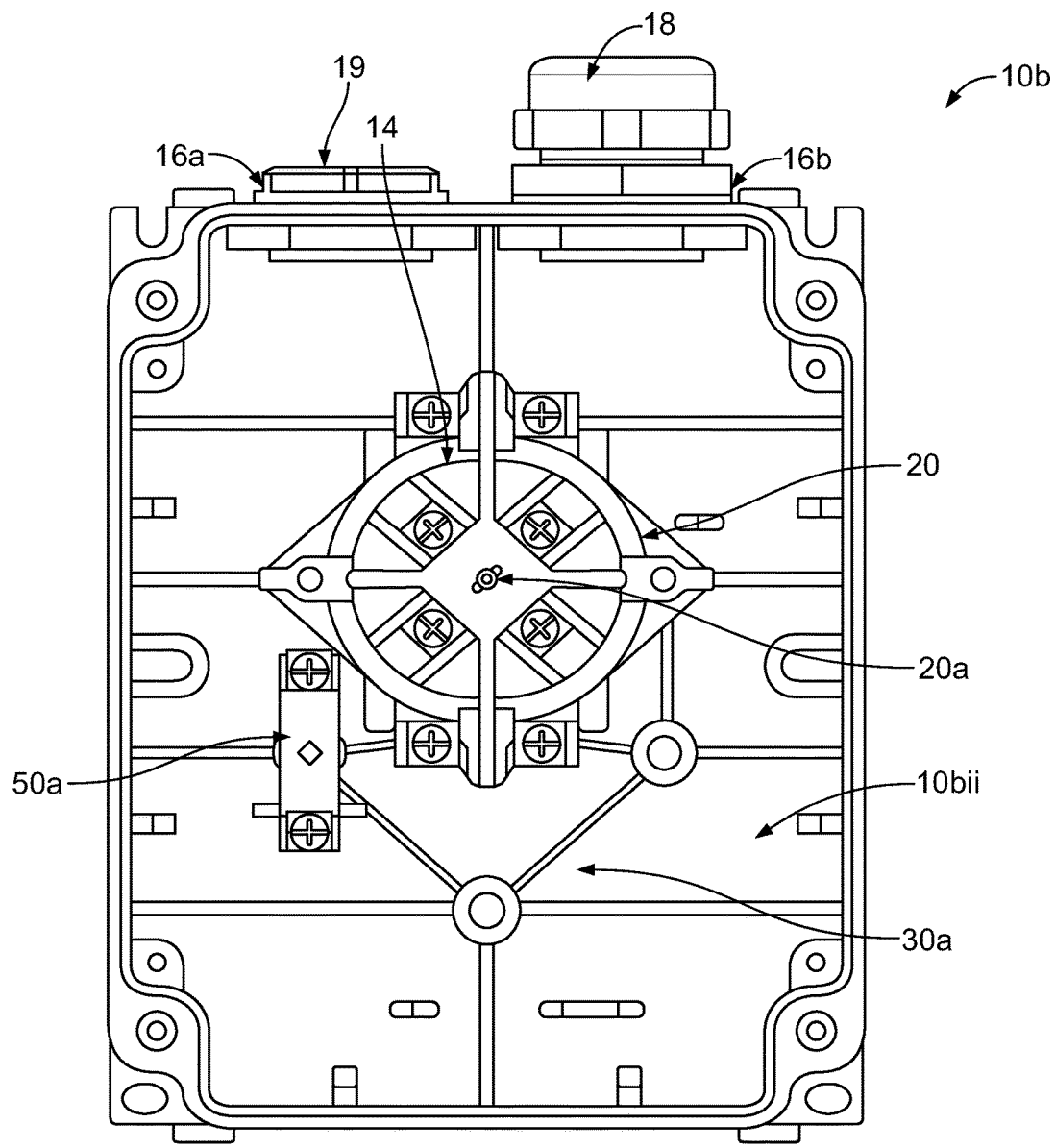
FIG. 6a illustrates a top view of the second compartment of the housing of the receptacle of FIG. 3, wherein the switch assembly is mounted on the second switch assembly mounting location.
Figure 6B:
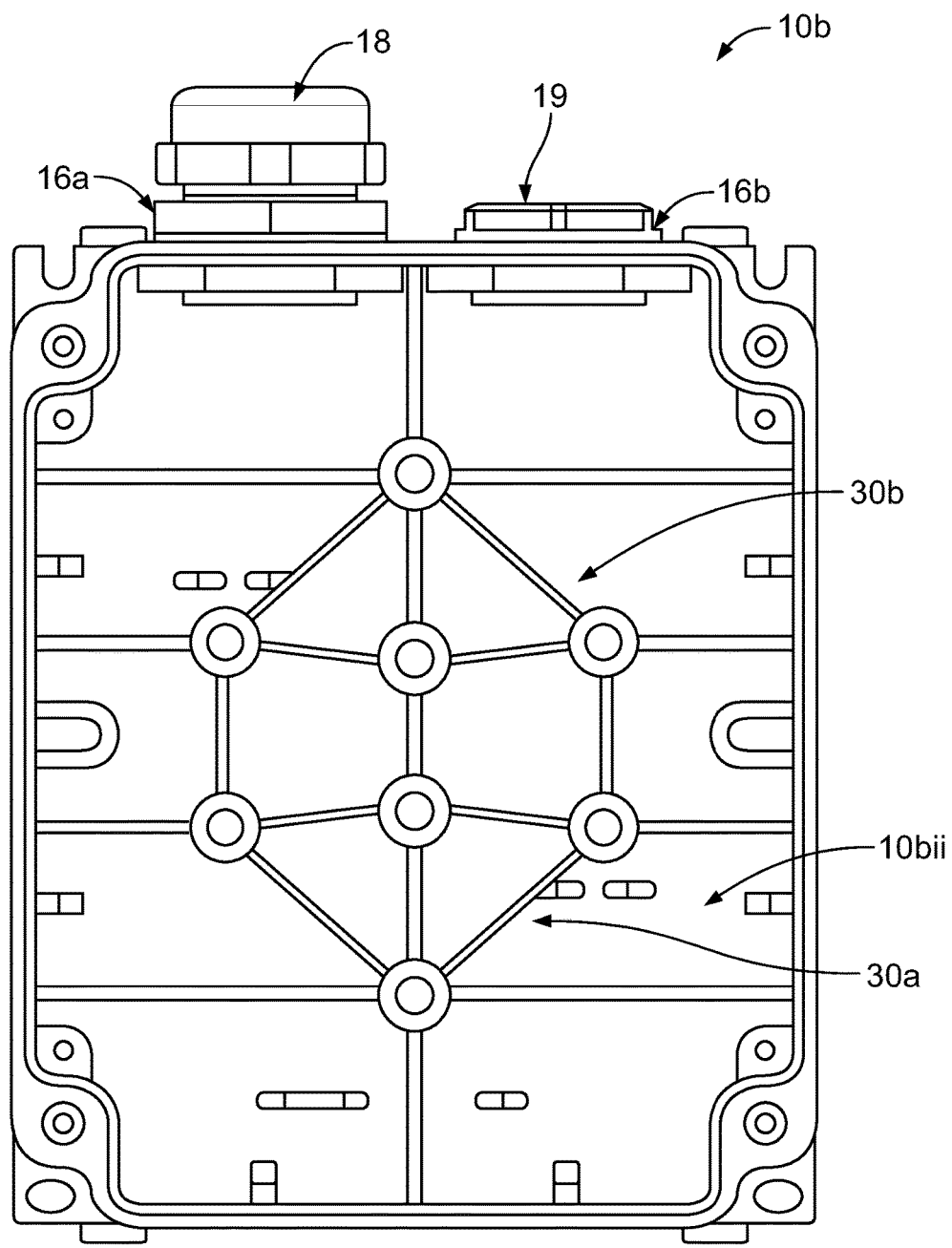
FIG. 6b illustrates a top view of the second compartment of FIG. 6a depicting the first and second switch assembly mounting locations without the switch assembly.

In a second position the power supply cables are positioned to enter the electrical receptacle assembly 100 operatively above the electrical receptacle assembly 100. Initially, the switch assembly 20 which is defined by the spindle 20a is mounted on the first switch assembly mounting location 30a (which is a first position) provided on the base 10bii of the second compartment 10b of the electrical receptacle assembly 100 is positioned to the second switch assembly mounting location 30b as illustrated in FIG. 6a and FIG. 6b. There-after, the cable gland 18 is removed from the third opening 16a and positioned on the third opening 16b for leading the power supply cables into the electrical receptacle assembly 100. The power supply cables are then threaded through the cable gland 18 positioned at the third opening 16b. There-after, the first compartment 10a is fitted to the second compartment 10b such that the central axis 'C' of the slot is aligned with the axis of the spindle 20a of the switch assembly 20.

The electrical receptacle assembly 100 can be mounted in a universal position for receiving the power supply cables from either operative top or operative bottom of the electrical receptacle assembly 100 based on the positioning of power supply cables. In case during installation of the electrical receptacle assembly 100, either if the planned position of the power supply cables is changed or the planned position of the power supply cables which was wrongly planned to be above or below the installation position of the electrical receptacle assembly 100 is changed, the positioning of the electrical receptacle assembly 100 may be comparatively easily changed to suit the new installation requirements without requirement of additional machining as required in conventional receptacles. Hence, the electrical receptacle assembly 100 requires comparatively less installation time and less overall cost during change in installation requirements.

Further, in case if inventory of the electrical receptacle assembly 100 is required to be maintained, less inventory is required to be maintained as the electrical receptacle assembly 100 is manufactured with a single configuration which can be used to receive the power supply cables through the operative top as well as the operative bottom of the electrical receptacle assembly 100 as compared to conventional receptacles wherein inventory is required to be maintained for two different configurations one for receiving the power supply cables through the operative top and another for receiving the power supply cables through the operative bottom of conventional receptacles. Hence, the inventory management of the electrical receptacle assembly 100 is comparatively less cumbersome.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation

TECHNICAL ADVANCES AND ECONOMICAL SIGNIFICANCE

The electrical receptacle assembly of the present disclosure described herein above has several technical advances including but not limited to the realization of:
- an electrical receptacle that can be easily installed on a structure at any angular position based on the positioning of electrical cables;
- an electrical receptacle that requires comparatively less installation time and less overall cost when the position of the electrical cables is changed; and
- an electrical receptacle that requires comparatively less inventory management.

What is claimed is:

1. An electrical receptacle assembly comprising:
   a housing comprising:
     a first compartment defining a first opening for a female connector to be connected to a male connector of an input power supply and a second opening for receiving a switch knob, said switch knob defining a slot along a central axis;
     a second compartment defining at least one third opening for receiving power supply cables, a base being provided for fitting a switch assembly in said housing, said switch assembly defining a spindle which is required to align axially with the slot along the central axis of the switch knob;
     a first and a second switch assembly mounting locations on said base being provided for mounting said switch assembly thereon such that the spindle is always aligned with the central axis of the switch knob, said first mounting location configured for use when the power supply cables are positioned to enter the receptacle from operatively below the receptacle and the second mounting location is configured for use when the power supply cables are positioned to enter the receptacle from operatively above the receptacle; and
     fasteners for removably fitting the first compartment with the second compartment with the spindle of the switch assembly aligned and fitted into the slot of the switch knob.

2. The electrical receptacle assembly as claimed in claim 1, wherein the receptacle is configured to receive power supply cables along an orthogonal or inclined operative vertical axis.

3. The electrical receptacle assembly as claimed in claim 1, wherein said at least one third opening is configured to receive a cable gland through which the power supply cables are led into the receptacles.

4. The electrical receptacle assembly as claimed in claim 1, wherein two third openings are provided on at least one of the operative bottom wall and the operative top wall of the second compartment for fixing the cable gland in the two operative positions of the power supply cables with respect to the receptacle in either of the two third openings, the un-operative third opening being sealed with a plug.

5. The electrical receptacle assembly as claimed in claim 1, wherein the mounting locations are formed on the base in form of a hexagon, the locations being defined at the vertices of the hexagon.

6. The electrical receptacle assembly as claimed in claim 1, wherein the mounting locations include a location for fitting an earthing cable within the receptacle.

7. The electrical receptacle assembly as claimed in claim 1, wherein the lower compartment includes a mounting hole for mounting the receptacle to a structure.

8. A method of connecting power supply cables to an electrical receptacle in either of two positions, in a first position when the power supply cables are positioned to enter the receptacle from operatively below the receptacle and a second position when the power supply cables are positioned to enter the receptacle from operatively above the receptacle comprising the following steps:
   fitting a switch assembly defining a spindle on one of two sets of mounting locations on a base of one of two compartments of the electrical receptacle, one set of mounting locations configured to accept the switch assembly for a first position and the second set of mounting locations configured to accept the switch assembly for a second position between the receptacle and the power supply cables;
   selecting one of two openings for mounting a cable gland on one of the operative top wall and the operative bottom wall of the electrical receptacle for leading the power supply cables into said receptacles;
   threading the power supply cables through said cable gland; and
   fitting the other compartment of the electrical receptacle bearing a switch knob defining a slot along a central axis in an aligned configuration with the spindle of the switch assembly.

* * * * *